(12) United States Patent
Fair et al.

(10) Patent No.: US 7,721,062 B1
(45) Date of Patent: May 18, 2010

(54) METHOD FOR DETECTING LEAKED BUFFER WRITES ACROSS FILE SYSTEM CONSISTENCY POINTS

(75) Inventors: Robert L. Fair, Cary, NC (US); Eric Hamilton, Durham, NC (US)

(73) Assignee: NetApp, Inc., Sunnyvale, CA (US)

( * ) Notice: Subject to any disclaimer, the term of this patent is extended or adjusted under 35 U.S.C. 154(b) by 562 days.

(21) Appl. No.: 10/705,470

(22) Filed: Nov. 10, 2003

(51) Int. Cl.
   G06F 13/14 (2006.01)
   G06F 12/02 (2006.01)

(52) U.S. Cl. .................. 711/170; 707/205; 707/206

(58) Field of Classification Search ................ 711/170; 707/205–206
   See application file for complete search history.

(56) References Cited

U.S. PATENT DOCUMENTS

| | | |
|---|---|---|
| 4,156,907 A | 5/1979 | Rawlings et al. |
| 4,399,503 A | 8/1983 | Hawley |
| 4,570,217 A | 2/1986 | Allen et al. |
| 4,598,357 A | 7/1986 | Swenson et al. |
| 4,688,221 A | 8/1987 | Nakamura et al. |
| 4,698,808 A | 10/1987 | Ishii |
| 4,761,785 A | 8/1988 | Clark et al. |
| 4,805,090 A | 2/1989 | Coogan |
| 4,837,675 A | 6/1989 | Bean et al. |
| 4,843,541 A | 6/1989 | Bean et al. |
| 4,864,497 A | 9/1989 | Lowry et al. |
| 4,896,259 A | 1/1990 | Jacobs et al. |
| 4,899,342 A | 2/1990 | Potter et al. |
| 4,916,608 A | 4/1990 | Shultz |
| 4,989,206 A | 1/1991 | Dunphy, Jr. et al. |
| 5,124,987 A | 6/1992 | Milligan et al. |
| 5,129,088 A | 7/1992 | Auslander et al. |
| RE34,100 E | 10/1992 | Hartness |
| 5,155,835 A | 10/1992 | Belsan |
| 5,163,131 A | 11/1992 | Row et al. |
| 5,202,979 A | 4/1993 | Hillis et al. |
| 5,218,695 A | 6/1993 | Noveck et al. |
| 5,278,979 A | 1/1994 | Foster et al. |
| 5,355,453 A | 10/1994 | Row et al. |
| 5,426,747 A | 6/1995 | Weinreb et al. |
| 5,485,579 A | 1/1996 | Hitz et al. |

(Continued)

FOREIGN PATENT DOCUMENTS

WO    WO 89/10594    11/1989

OTHER PUBLICATIONS

U.S. Appl. No. 10/027,634, Edwards et al., U.S. Patent Application filed Dec. 21, 2001 entitled File System Defragmentation Technique Via Write Allocation.

(Continued)

*Primary Examiner*—Stephen C Elmore
*Assistant Examiner*—Shawn Eland
(74) *Attorney, Agent, or Firm*—Cesari and McKenna, LLP

(57) ABSTRACT

A system and method for detecting buffer leaks in a files system utilizing consistency points is provided. Upon receipt of a write operation, a buffer check control structure is written to a raw data buffer. The buffer check control structure comprises a set of magic numbers and a consistency point counter identifying the current CP. At write allocation time, the buffer check control structure is examined to determine that the buffer is being committed to disk during the correct CP.

57 Claims, 9 Drawing Sheets

U.S. PATENT DOCUMENTS

| | | | |
|---|---|---|---|
| 5,511,177 | A | 4/1996 | Kagimasa et al. |
| 5,581,724 | A | 12/1996 | Belsan et al. |
| 5,764,972 | A | 6/1998 | Crouse et al. |
| 5,790,778 | A * | 8/1998 | Bush et al. ............... 714/38 |
| 5,802,366 | A | 9/1998 | Row et al. |
| 5,819,292 | A | 10/1998 | Hitz et al. |
| 5,828,876 | A | 10/1998 | Fish et al. |
| 5,832,513 | A | 11/1998 | Kennedy |
| 5,870,734 | A | 2/1999 | Kao |
| 5,897,661 | A | 4/1999 | Baranovsky et al. |
| 5,907,672 | A | 5/1999 | Matze et al. |
| 5,918,229 | A | 6/1999 | Davis et al. |
| 5,931,918 | A | 8/1999 | Row et al. |
| 5,941,972 | A | 8/1999 | Hoese et al. |
| 5,944,789 | A | 8/1999 | Tzelnic et al. |
| 5,963,962 | A | 10/1999 | Hitz et al. |
| 5,987,477 | A | 11/1999 | Schmuck et al. |
| 5,996,047 | A | 11/1999 | Peacock |
| 6,038,570 | A | 3/2000 | Hitz et al. |
| 6,065,037 | A | 5/2000 | Hitz et al. |
| 6,128,627 | A | 10/2000 | Mattis et al. |
| 6,173,293 | B1 | 1/2001 | Thekkath et al. |
| 6,173,374 | B1 | 1/2001 | Heil et al. |
| 6,185,655 | B1 | 2/2001 | Peping |
| 6,192,377 | B1 * | 2/2001 | Ganesh et al. ............ 707/203 |
| 6,240,527 | B1 | 5/2001 | Schneider et al. |
| 6,275,898 | B1 | 8/2001 | DeKoning |
| 6,397,311 | B1 | 5/2002 | Capps |
| 6,425,035 | B2 | 7/2002 | Hoese et al. |
| 6,453,354 | B1 | 9/2002 | Jiang et al. |
| 6,526,478 | B1 | 2/2003 | Kirby |
| 6,571,261 | B1 | 5/2003 | Wang-Knop et al. |
| 6,606,690 | B2 | 8/2003 | Padovano |
| 6,618,798 | B1 | 9/2003 | Burton et al. |
| 6,636,879 | B1 | 10/2003 | Doucette et al. |
| 6,643,654 | B1 | 11/2003 | Patel et al. |
| 6,732,124 | B1 | 5/2004 | Koseki et al. |
| 6,748,504 | B2 | 6/2004 | Sawdon et al. |
| 6,804,706 | B2 | 10/2004 | Pitts |
| 6,983,296 | B1 | 1/2006 | Muhlestein et al. |
| 2002/0049883 | A1 | 4/2002 | Schneider et al. |
| 2002/0087500 | A1 | 7/2002 | Berkowitz et al. |
| 2002/0091670 | A1 | 7/2002 | Hitz et al. |
| 2002/0103819 | A1 * | 8/2002 | Duvillier et al. ............ 707/206 |
| 2002/0112022 | A1 | 8/2002 | Kazar et al. |
| 2002/0116593 | A1 | 8/2002 | Kazar et al. |
| 2003/0163661 | A1 * | 8/2003 | Marion et al. ............... 711/170 |
| 2004/0064474 | A1 | 4/2004 | Hitz et al. |
| 2004/0220961 | A1 | 11/2004 | Lee et al. |
| 2005/0066095 | A1 | 3/2005 | Mullick et al. |
| 2005/0071586 | A1 | 3/2005 | Bartfai et al. |
| 2005/0097142 | A1 | 5/2005 | Best et al. |
| 2005/0097260 | A1 | 5/2005 | McGovern et al. |
| 2006/0184587 | A1 | 8/2006 | Federwisch et al. |

OTHER PUBLICATIONS

U.S. Appl. No. 10/215,917, Pawlowski et al., U.S. Patent Application filed Aug. 9, 2002 entitled Multi-Protocol Storage Appliance That Provides Integrated Support for File and Block Access Protocols.

U.S. Appl. No. 10/705,493, Hamilton et al., U.S. Patent Application filed Nov. 10, 2003 entitled System and Method for Managing File Data During Consistency Points.

U.S. Appl. No. 10/705,025, Hamilton et al., U.S. Patent Application filed Nov. 10, 2003 entitled System and Method for Managing File Metadata During Consistency Points.

"Network Appliance Ends NAS/SAN War" by Computerwire, http://www.theregister.co.uk/content/63/27368.html; posted on Feb. 10, 2002.

David Hitz et al. TR3002 File System Design for a NFS File Server Appliance published by Network Appliance, Inc.

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

Fielding et al. (1999) Request for Comments (RFC) 2616, HTTP/1.1.

Celerra File Server Architecture for High Availability, EMC2 where information lives, Aug. 1999, pp. 1-7.

Ron Lenive and Michelle Gervais, Building a SAN, SunExpert Magazine, Mar. 1999, pp. 50-64.

Unix Workstation System Administration Education Certification Course, Jan. 8, 2002.

Auspex Systems, LFS—A Local File System for Multiprocessor NFS Network Servers, 1994.

Maintenance Procedures ND (8C) nd-network disk control Feb. 1985.

Misc. Reference Manual Pages ND (4P) nd-network disk driver Jul. 26, 1985.

Asante EN/SC Adapter Family Installation Guide May 1994.

Asante Desktop EN/SC Adapters User's Manual Apr. 1996.

Performance Without Compromise: The Virtual Storage Architecture 1997.

Callaghan B. "NFS Version 3 Protocol Specification", Request for Comments (RFC) 1813 Jun. 1995.

International Search Report PCT/US03/23597, Mar. 9, 2004, 7 pages, International Searching Authority, Alexandria, Virginia, USA.

International Search Report PCT/US03/23597, Apr. 14, 2004, 8 pages, International Searching Authority, Alexandria, Virginia, USA.

Akyurek, Sedat, *Placing Replicated Data to Reduce Seek Delays*, Department of Computer Science, University of Maryland, UMIACS-TR-91-121, CS-TR-2746, Aug. 1991.

Bitton, Dina, *Disk Shadowing*, Proceedings of the 14$^{th}$ VLDB Conference, LA, CA 1988.

Chaudhuri, Surajit, et al., *Self-Tuning Technology in Microsoft SQL Server*, Data Engineering Journal 22, 2 1999 pp. 20-27.

Chutani, Sailesh, et al., *The Episode File System*, In Proceedings of the USENIX Winter 1992.

Coyne, Robert A., et al., *Storage Systems for National Information Assets*, Proc. Supercomputing 92, Minneapolis, Nov. 1992, pp. 626-633.

Finlayson, Ross S., et al., *Log Files: An Extended File Service Exploiting Write-Once Storage* Department of Computer Science, Stanford University, Report No. STAN-CS-87-1177, Sep. 1987.

Gray, Jim, et al., *The Recovery Manager of the System R Database Manager*, ACM Computing Surveys, (13)2:223-242 1981.

Hecht, Matthew S., et al. *Shadowed Management of Free Disk Pages with a Linked List*, ACM Transactions on Database Systems, 8/4, Dec. 1983, pp. 503-514.

Howard, John, H. et al., *Scale and Performance in a Distributed File System*, Carnegie Mellon University, CMU-ITC-87-068, Aug. 1987.

Howard, John H., *An Overview of the Andrew File System*, Carnegie Mellon University, CMU-ITC-88-062 1988.

Howard, John, H. et al., *Scale and Performance in a Distributed File System*, ACM Trans. Computer System, 6(1), Feb. 1988 pp. 51-81.

Kazar, Michael Leon, *Synchronization and Caching Issues in the Andrew File System*, Carnegie Mellon University, CMU-ITC-88-063.

Kazar, Michael L., et al., *DEcorum File System Architectural Overview*, USENIX Summer Conference, Anaheim, California, 1990.

Kemper, Alfons, et al., *Performance Tuning for SAP R/3*, Data Engineering Journal 22, 2 1999 pp. 33-40.

Kent, Jack et al., *Optimizing Shadow Recovery Algorithms, IEEE Transactions on Software Engineering*, 14( 2): 155-168, Feb. 1988.

Kistler, et al., *Disconnected Operation in the Coda File System*, ACM Transactions on Computer Systems, vol. 10, No. 1, Feb. 1992, pp. 3-25.

Lorie, Raymond, A. *Physical Integrity in a Large Segmented Database*, ACM Trans. Database Syst., vol. 2, Mar. 1977, pp. 91-104.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley 1987.

Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.

Quinlan, Sean, *A Cached WORM File System*, Software-Practice and Experience, 21(12):1289-1299 1991.

Rosenblum, Mendel, et al., *The LFS Storage Manager*, Computer Science Division, Electrical Engineering And Computer Sciences, Univ. of CA, presented at Summer '90 USENIX Technical Conference, Anaheim, CA Jun. 1990.

Rosenblum, Mendel, et al. *The Design and Implementation of a Log-Structured File System* Jul. 24, 1991 pp. 1-15.

Rosenblum, Mendel, *The Design and Implementation of a Log-Structured File System*, 1992 pp. 1-93.

Rosenblum, Mendel, et al., *The Design and Implementation of a Log-Structured File System*, In Proceedings of ACM Transactions on Computer Systems, (10)1:26-52, Feb. 1992.

Schiefer, Berni, et al., *DB2 Universal Database Performance Tuning*, Data Engineering Journal 22, 2 1999 pp. 12-19.

Seltzer, Margo I., et al., *Journaling Versus Soft Updates: Asynchronous Meta-Data Protection in File Systems*, Proceedings of 200 USENIX Annual Technical Conference, Jun. 18-23, 2000.

Shasha, Dennis, *Tuning Time Series Queries in Finance: Case Studies and Recommendations*, Data Engineering Journal 22, 2 1999 pp. 41-47.

Sidebotham, Bob; *Volumes: The Andrew File System Data Structuring Primitive*, EEUG Conference Proceedings, Manchester, UK, Autumn 1986.

Subramanian, Muralidhar, et al., *Performance Challenges in Object-Relational DBMSs*, Data Engineering Journal 22, 2 1999 pp. 28-32.

Weikum, Gerhard, et al., *Towards Self-Tuning Memory Management for Data Servers*, Data Engineering Journal 22, 2 1999 pp. 3-11.

West, Michael, et al. *The ITC Distributed File System: Prototype and Experience*, Carnegie-Mellon University, Technical Report CMU-ITC-040, Mar. 1985.

Zayas, Edward R, AFS-3 Programmer's Reference: Architectural Overview, Transarc Corporation, Pittsburgh, PA, 1.0 edition 1991.

Administration Gruide found at http://www.openafs.org/pages/doc/AdminGuide/auagd010.htm, visited on Mar. 2, 2005.

Basilico, et al., *Error Correction System Using "Shadow Memory,"* IBM Technical Disclosure Bulletin, May 1984, pp. 5792-5793.

Bitton, Dina, *Disk Shadowing*, Proceedings of the 14$^{th}$ VLDB Conference, LA, CA (1988).

Blasgen, M.W. et al., *System R: An architectural Overview*, Reprinted from IBM Systems Journal vol. 20, No. 1, 1981 © 1981, 1999.

Borenstein, Nathaniel, S., *CMU's Andrew project a retrospective*, Communications of ACM, (39)12, Dec. 1996.

Brown, Mark R. et al., *The Alpine file system*, ACM Transactions on Computing Systems, 3(4):261-293, Nov. 1985.

Chutani, Sailesh, et al., *The Episode file system*, In Proceedings of the USENIX Winter 1992.

Clark, B.E., et al., *Application System /400 Performance Characteristics*, IBM Systems Journal, 28(3):407-423, 1989.

Data Sheet for the Check Point Software Technologies product Flood-Gate-1 (1997).

Dibble, Peter C., et al., Beyond Striping: The Bridge Multiprocessor File System, Computer Science Department, University of Rochester, Aug. 11, 1989.

Gait, Jason, *Phoenix: A Safe In-Memory File System*. Communications of the ACM, 33(1):81-86, Jan. 1990.

Hartman, John H. et al., *Performance Measurements of a Multiprocessor Sprite Kernel*, Proceedings of the USENIX Conference, 1990.

Hitz, Dave et al., *File System Design for an NFS File Server Appliance*, Technical Report 3002, Rev. C395, presented Jan. 19, 1994.

Howard, John H, et al. *Scale and Performance in a Distributed File System*, Carnegie Mellon University, CMU-ITC-87-068, Aug. 5, 1987.

Howard, John, H. et al., *Scale and performance in a distributed file system*, ACM Trans. Computer. System., 6(1), Feb. 1988 pp. 51-81.

Howard, John H., *An Overview of the Andrew File System*, Carnegie Mellon University, CMU-ITC-88-062.

Isomaki, Markus, *Differentiated Service for the Internet*, Department of Technical Physics and Mathematics, May 9, 1998.

Kazar, Michael L., et al., *Decorum File System Architectural Overview*, USENIX Summer Conference, Anaheim, California, 1990.

Lorie, Raymond, A, *Physical integrity in a large segmented database*, ACM Trans. Database Systems, (2)1: 91-104, Mar. 1977.

Lorie, RA, *Shadow Page Mechanism*, IBM Technical Disclosure Bulletin, Jun. 1986, pp. 340-342.

McKusick, Marshall Kirk, et al., *A Fast File System for UNIX*, Computer Science Division, Department of Electrical Engineering and Computer Sciences, Univ. of CA, Berkley, Feb. 18, 1994.

Miller, Ethan L., et al., *RAMA:A File System for Massively Parallel Computers*, 12$^{th}$ IEEE Symposium on Mass Storage Systems, Monterey CA, Apr. 1993, pp. 163-168.

Morris, James H., et al, *Andrew: A Distributed Personal Computing Environment*, Comm. of the ACM, vol. 29, Mar. 1986, pp. 184-201.

Mullender, Sape J., et al., *A distributed file service based on optimistic concurrency control*, ACM Symposium on Operating System Principles (Orcas Island, Washington). Published as Operating Systems Review, 19(5):51-62, Dec. 1985.

Muller, Keith, et al., *A High Performance Multi-Structured File System Design*, In Proceedings of the 13th ACM Symposium on Operating Systems Principles, Oct. 1991, pp. 56-67.

Ousterhout, John K. et al., *The Sprite Network Operating System*, Computer Science Division, Department of Electrical Engineering and Computer Sciences, Univ. of CA, Berkley, Nov. 19, 1987.

Ousterhout, John, *Why Aren't Operating Systems Getting Faster as Fast as Hardware?*, Digital WRL Technical Note TN-II, Oct. 1989.

Ousterhout, John, *A Brief Retrospective On The Sprite Network Operating System*, found at http://www.cs.berkeley.edu/projects/sprite/retrospective.html.visited on Mar. 11, 2005.

Patterson, D., et al., *A Case for Redundant Arrays of Inexpensive Disks (RAID)*. Technical Report, CSD-87-39I, Computer Science Division, Electrical Engineering and Computer Sciences, University of California at Berkeley (1987).

Peterson, Zachary Nathaniel Joseph, *Data Placement for Copy-on-Wire Using Virtual Contiguity*, University of CA, Santa Cruz, Master of Science in Computer Science Thesis, Sep. 2002.

Quinlan, Sean, *A Cached WORM File System*, Software-Practice and Experience, 21(12):1289-1299 (1991).

Redundant Array of Independent Disks, from Wikipedia, the free encyclopedia, found at http://en.wikipedia.org/wiki/RAID, visited on Mar. 9, 2005.

Rosenblum, Mendel, et al., *The Design and Implementation of a Log-Structured File System*, , In Proceedings of ACM Transactions on Computer Systems, (10)1:26-52, Feb. 1992.

Sandberg, Russel et al., *Design and implementation of the Sun Network Filesystem*. In Proc. Summer 1985 USENIX Conf., pp. 119-130, Portland OR (USA), Jun. 1985.

Santry, Douglas S., et al., *Deciding When to Forget in the Elephant File System*, Operating Systems Review, 34(5), (Dec. 1999) pp. 110-123.

Satyanarayanan,.M.. *A survey of distributed file-systems*. Annual Review of Computing Science, 4(73-104), 1989.

Satyanarayanan, M., et al, *Coda: A highly available file system for a distributed workstation environment* Carnegie Mellon University, CMU-ITC.

Satyanarayanan, M., et al, *Coda: A highly available file system for a distributed workstation environment*. IEEE Transactions on Computers, 39(4):447-459, 1990.

Satyanarayanan, Mahadev, *Scalable, Secure, and Highly Available Distributed File Access*, Computer May 1990: 9-21.

User Guide found at http://www.openafs.org/pages/doc/UserGuide/auusg004.htm, visited on Mar. 2, 2005.

Welch, Brent B., et al., *Pseudo Devices: User-Level Extensions to the Sprite File System*, Computer Science Division, Department of Electrical Engineering and Computer Sciences, Univ. of CA, Berkley, Apr. 1988.

Welch, Brent B., et al., *Pseudo-File-Systems*, Computer Science Division, Department of Electrical Engineering and Computer Sciences, Univ. of CA, Berkley, Oct. 1989.

Wittle, Mark, et al, *LADDIS: The next generation in NFS file server benchmarking*, USENIX Association Conference Proceedings, Apr. 1993.

Chen, Peter M., et al., An Evaluation of Redundant Arrays of Disks Using an Amdahl 5890 Performance Evaluation, 1990 (12 pages total).

Douglis, Fred, et al., A comparison of two distributed systems: Amoeba and Sprite—Computing Systems, 4(4), Fall 1991. (27 pages total).

The IBM System/38, Chapter 8, pp. 137-157.

Moons, Herman et al., Location-Independent Object Invocation in Open Distributed Systems, Autumn 1991 EurOpen Technical Conference and Exhibition, (Sep. 16-20, 1991) (13 pages total).

Rosenberg, J., et al., Stability in a Persistent Store Based on a Large Virtual Memory, In Security and Persistence, Rosenber, J. & Keedy, J.L. (ed), Springer-Verlag (1990) (18 pages total).

Satyanarayanan, M., et al., The ITC Distributed File System: Principles and Design, In Proceedings of the 10th ACM Symposium on Operating Systems Principles, (19)5:35-50, Dec. 1985.

Patterson, D., et al., "A Case for Redundant Arrays of Inexpensive Disks (RAID)," SIGMOD International Conference on Management of Data, Chicago, IL, USA, Jun. 1-3, 1988, SIGMOD Record (17)3:109-15 Sep. 1988.

Lomet, David., et al., The performance of a multiversion access method, ACM SIGMOD International Conference on Management of Data, 19, (11 pages total).

Nelson et al., "Caching in the Sprite Network File System", ACM, Nov. 1987, pp. 3-4.

Bhattacharya et al., "Coordinating Backup/Recovery and Data Consistency Between Database and File Systems", ACM, Jun. 2002, pp. 500-511.

Lu et al., Performance Study of iSCSI-Based Storage Subsystems, IEEE Communications Magazine, pp. 76-82, Aug. 2003.

* cited by examiner

METHOD FOR DETECTING LEAKED BUFFER WRITES ACROSS FILE SYSTEM CONSISTENCY POINTS

RELATED APPLICATIONS

This application is related to the following United States Patent Applications:

Ser. No. 10/705,025, entitled SYSTEM AND METHOD FOR MANAGING FILE DATA DURING CONSISTENCY POINTS, by Eric Hamilton, et al., the teachings of which are expressly incorporated herein by reference; and Ser. No. 10/705,493, entitled SYSTEM AND METHOD FOR MANAGING FILE METADATA DURING CONSISTENCY POINTS, by Eric Hamilton, et al., the teachings of which are expressly incorporated herein by reference.

FIELD OF THE INVENTION

The present invention relates to file systems and, more specifically, to detecting leaked buffer writes across consistency points in a file system.

BACKGROUND OF THE INVENTION

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The file server, or filer, may be further configured to operate according to a client/server model of information delivery to thereby allow many client systems (clients) to access shared resources, such as files, stored on the filer. Sharing of files is a hallmark of a NAS system, which is enabled because of its semantic level of access to files and file systems. Storage of information on a NAS system is typically deployed over a computer network comprising a geographically distributed collection of interconnected communication links, such as Ethernet, that allow clients to remotely access the information (files) on the filer. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS), the Network File System (NFS) and the Direct Access File System (DAFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC or TCP/IP/Ethernet.

A common type of file system is a "write in-place" file system, an example of which is the conventional Berkeley fast file system. In a write in-place file system, the locations of the data structures, such as inodes and data blocks, on disk are typically fixed. An inode is a data structure used to store information, such as metadata, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a storage appliance is the Write Anywhere File Layout (WAFL™) file system available from Network Appliance, Inc. of Sunnyvale, Calif. The WAFL file system is implemented within a microkernel as part of the overall protocol stack of the filer and associated disk storage. This microkernel is supplied as part of Network Appliance's Data ONTAP™ storage operating system, residing on the filer, that processes file-service requests from network-attached clients.

As used herein, the term "storage operating system" generally refers to the computer-executable code operable on a storage system that manages data access and may, in case of a filer, implement file system semantics, such as the Data ONTAP™ storage operating system. The storage operating system can also be implemented as an application program operating over a general-purpose operating system, such as UNIX® or Windows NT®, or as a general-purpose operating system with configurable functionality, which is configured for storage applications as described herein.

Disk storage is typically implemented as one or more storage "volumes" that comprise physical storage disks, defining an overall logical arrangement of storage space. Currently available storage system (filer) implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of parity information with respect to the striped data. In the example of a WAFL-based file system, a RAID 4 implementation is advantageously employed. This implementation specifically entails the striping of data across a group of disks, and separate parity storage within a selected disk of the RAID group. As described herein, a volume typically comprises at least one data disk and one associated parity disk (or possibly data/parity partitions in a single disk) arranged according to a RAID 4, or equivalent high-reliability, implementation.

A well-known sub-volume unit is a quota tree (qtree). Unlike volumes, which are mapped to particular collections of disks (e.g. RAID groups of n disks) and act more like traditional partitions, a qtree is implemented at a higher level than volumes and can, thus, offer more flexibility. Qtrees are basically an abstraction in the software of the storage operating system. Each volume may, in fact, contain multiple qtrees. The granularity of a qtree can be a sized to just as a few kilobytes of storage. Qtree structures can be defined by an appropriate file system administrator or user with proper permission to set such limits.

A consistency point (CP) is a wholly consistent and up-to-date version of the file system that is typically written to disk or to other persistent storage media. In a system utilizing CPs, a CP of the file system is generated typically at regular time intervals. Thus, in the event of an error condition, only information written to files after the last CP occurred are lost or corrupted. If a journaling file system is utilized where write operations are "logged" (stored) before being committed to disk, the stored operations can be replayed to restore the file system "up to date" after a crash other error condition. In the example of a WAFL-based journaling file system, these CPs ensure that no information is lost in the event of a storage system crash or other error condition. CPs are further described in U.S. Pat. No. 5,819,292, entitled METHOD FOR MAINTAINING CONSISTENT STATES OF A FILE SYSTEM AND FOR CREATING USER-ACCESSIBLE READ-ONLY COPIES OF A FILE SYSTEM, by David Hitz, et al., which is hereby incorporated by reference.

In a CP-based file system, the on-disk copy of the file system is usually slightly "out of date" compared to the instantaneous state of the file system that is stored in a memory of the storage system. During the write allocation phase of a CP, the file system identifies all information that must appear in the CP and writes it to disk. Once this write operation completes, the on-disk copy of the file system reflects the state of the file system as of the CP. However, the time required to identify the information that must be written to disk in a given CP and to perform the actual write operation typically takes much longer than the time required for an individual file system operation to complete. Thus, a file system utilizing CPs typically halts or otherwise suspends write operations during the time required to perform write allocation during the CP. Under heavy loads involving large files, this time may be on the order of tens of seconds, which seriously impedes access latency for clients of the storage system. For example, a client will not receive an acknowledgement of a write access request until such time as the CP has been completed, thus causing some application programs executing on the client to generate error messages or suffer failure conditions due to timeout conditions.

Additionally, system performance may be impaired due to increased latency resulting from a large number of incoming write operations that may be queued and suspended while the CP write allocation operation is performed. A database that issues many write operations to modify a file is an example of a system that may suffer reduced performance because of the increased latency. A solution to this problem is to allow execution of write operations during an ongoing CP. However, such a solution requires that the storage system be able to identify and differentiate incoming information (i.e., write data and metadata) associated with both the modified file and the appropriate CP that the information is related thereto. For example, if a file is currently undergoing write allocation and an incoming write operation is received, the storage system must separate and differentiate the incoming information from the information currently being write allocated. If the storage system fails to differentiate properly between the two types of information (i.e., write data and metadata), the file system, and more specifically, the file undergoing write allocation, may lose consistency and/or coherency, with an accompanying loss of information or an inability to access the stored information.

In certain storage system architectures, the storage operating system, or file system embodied within the storage operating system, may permit continued write operations to a file undergoing write allocation by the use of current and next consistency point counters in cooperation with a buffer control structure. In such implementations, incoming write operations that are received during the write allocation phase of a file are tagged to be processed during the next CP. An example of such a system is described in the above-incorporated and commonly-assigned patent applications entitled, SYSTEM AND METHOD FOR MANAGING FILE DATA DURING A CONSISTENCY POINT and SYSTEM AND METHOD FOR MANAGING FILE METADATA DURING A CONSISTENCY POINT.

A file system typically stores incoming (write) data to be written to disk in one or more data buffers associated with the file or other data container, e.g. a virtual disk (vdisk), etc. In storage appliances that utilize current and next consistency points, it is possible to have data associated with more than one consistency point in a data buffer at a given time. Information, such as pointers referencing the data buffers associated with specific CPs, stored in the buffer control structure are not guaranteed to correctly identify the CP associated with a specific write operation as these pointers may become corrupted. For example, the value of a pointer may be inadvertently altered to that of another pointer such that the data from one data buffer may "leak" from its proper CP to another CP. Special flags may be added to the buffer control structure to identify which pointers within the buffer control structure point to the data buffers storing data destined for current CP and to the next CP data; however, the data buffers are often involved with copy on write operations, which may cause the flags within the buffer control structure to not correctly identify the appropriate CPs. Additionally, these flags may become corrupted if the buffer control structure is corrupted, thereby resulting in buffer leakage. If such a buffer leakage occurs, improper data may be written to disk, thereby corrupting the file, or other data container, and causing the file system to lose coherency and/or consistency.

SUMMARY OF THE INVENTION

The disadvantages of the prior art are overcome by providing a system and method for detecting leaked buffer write operations across file system consistency points generated by a storage system. According to the illustrative embodiment, when the storage system receives an incoming write operation, a volume or qtree to which the operation is directed is examined to determine if a buffer check option is active. If so, a buffer check control structure is overwritten into the first part of the raw data area of the data stored in memory. The buffer check control structure includes two 32-bit "magic" numbers that are utilized by a file system of the storage operating system to uniquely identify the buffer check control structure. As a further safeguard, a 32-bit consistency point (CP) value associated with the data for the CP is also embedded in the buffer check control structure. Thus, to generate a false positive, the raw data area needs to reproduce the 64-bits of magic number, as well as the appropriate 32-bit value of the CP. The probability of a random match is therefore 1 in $2^{96}$.

During the write allocation phase of a consistency point, the buffer check control structure is analyzed to determine if it is properly associated with the CP. This is accomplished, in the illustrative embodiment, by analyzing the CP value stored in the buffer check control structure with the current CP value. If they match, then the data is associated with the proper CP and the write operation continues. If, however, the CP value stored in the buffer check control structure is not the value of the current CP, then the buffer data has leaked from one CP to another and the write operation halts.

The ability to check for leakage in buffer write operations may, in the illustrative embodiment, be activated on a per volume or per qtree basis. As the buffer check control structure overwrites the initial portion of the raw data of the write operation, it is destructive and renders the stored data inoperative. However, in alternate embodiments, the buffer check control structure may be prepended or postpended to the raw data, thereby permitting the teachings of the present invention to be utilized in a non-destructive labeling environment.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Storage Appliance

When used in a SAN environment, a storage system may be embodied as a multi-protocol storage appliance having a storage operating system that implements a file system and provides for storage virtualization and support for virtual disks (vdisks). An example of a multi-protocol storage appliance that may be advantageously used with the present invention is described in co-pending and commonly assigned U.S. patent application Ser. No. 10/215,917 entitled A MULTI-PROTOCOL STORAGE APPLIANCE THAT PROVIDES INTEGRATED SUPPORT FOR FILE AND BLOCK ACCESS PROTOCOLS, by Brian Pawlowski, et al., which is hereby incorporated by reference as though fully set forth herein.

Figure 1:
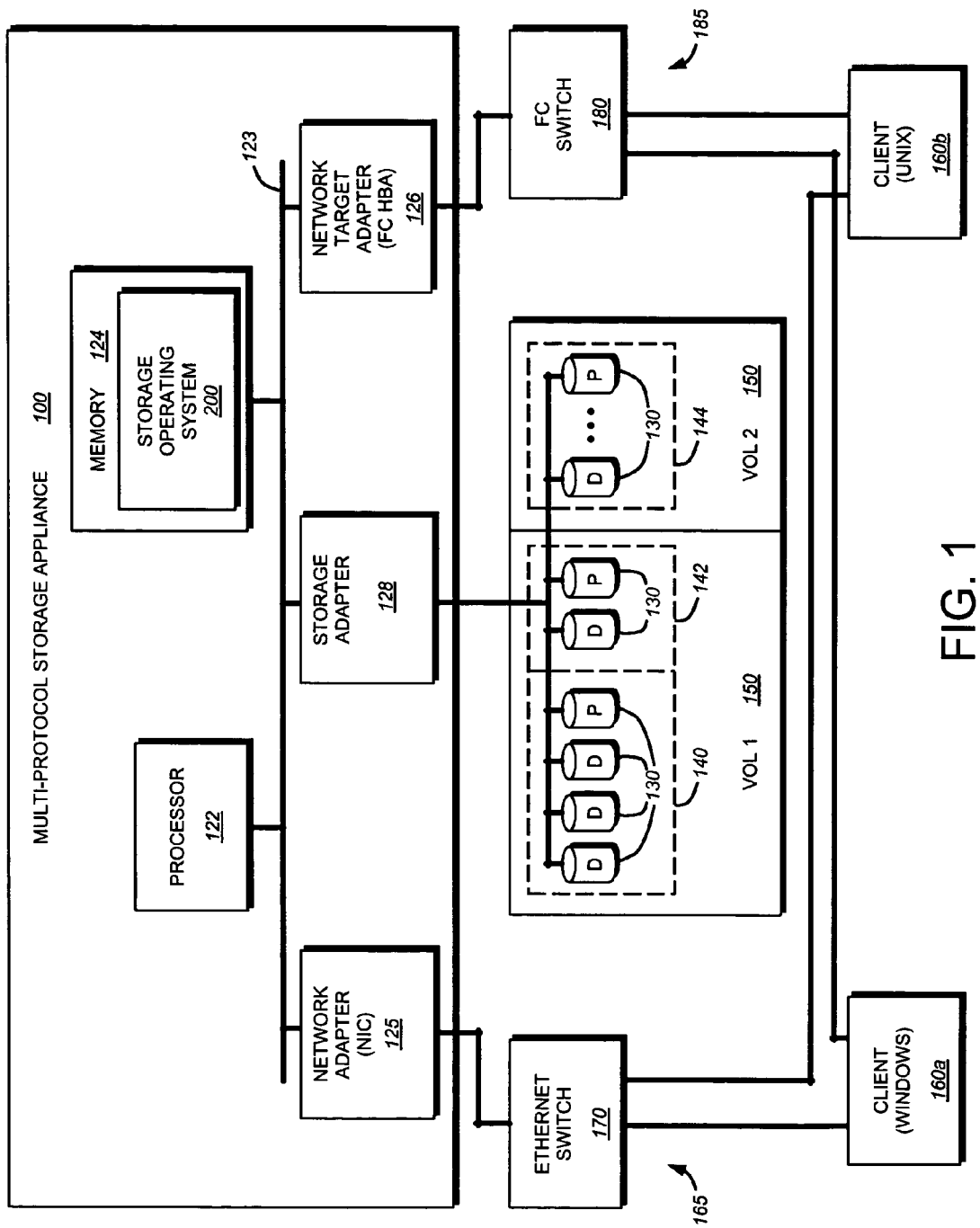
FIG. 1 is a schematic block diagram of an exemplary storage system network in accordance with an embodiment of the present invention.

FIG. 1 is a schematic block diagram of an illustrative storage appliance 100 that may be advantageously used with the present invention. The storage appliance is configured to provide storage service for both file and block protocol access to information stored on storage devices in an integrated manner. In this context, the storage appliance, denotes a computer having features such as simplicity of storage service management and ease of storage reconfiguration, including reusable storage space, for users (system administrators) and clients of network attached storage (NAS) and storage area network (SAN) deployments.

The multi-protocol storage appliance 100 is illustratively embodied as a storage system comprising a processor 122, a memory 124, a plurality of network adapters 125, 126 and a storage adapter 128 interconnected by a system bus 123. The multi-protocol storage appliance 100 also includes a storage operating system 200 that provides a virtualization system (and, in particular, a file system) to logically organize the information as a hierarchical structure of named directory, file and virtual disk (vdisk) storage objects on the disks 130.

The clients of a SAN-based network environment have a storage viewpoint of blocks or disks. To that end, the multi-protocol storage appliance 100 presents (exports) disks to SAN clients through the creation of logical unit numbers (luns) or vdisk objects. A vdisk object (hereinafter "vdisk") is a special file type that is implemented by the virtualization system and translated into an emulated disk as viewed by the SAN clients. The multi-protocol storage appliance thereafter makes these emulated disks accessible to the SAN clients through controlled exports, as described further herein.

In the illustrative embodiment, the memory 124 comprises storage locations that are addressable by the processor and adapters for storing software program code and data structures associated with the present invention. A portion of memory 124 may be organized as a "buffer cache" for storing data structures for use by the storage operating system during runtime operation. The processor and adapters may, in turn, comprise processing elements and/or logic circuitry configured to execute the software code and manipulate the data structures. The storage operating system 200, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the invention described herein.

The network adapter 125 couples the storage appliance to a plurality of clients 160a,b over point-to-point links, wide area networks, virtual private networks implemented over a public network (Internet) or a shared local area network, hereinafter referred to as an illustrative Ethernet network 165. For this NAS-based network environment, the clients are configured to access information stored on the multi-protocol appliance as files. Therefore, the network adapter 125 may comprise a network interface card (NIC) having the mechanical, electrical and signaling circuitry needed to connect the appliance to a network switch, such as a conventional Ethernet switch 170. The clients 160 communicate with the storage appliance over network 165 by exchanging discrete frames or packets of data according to pre-defined protocols, such as the Transmission Control Protocol/Internet Protocol (TCP/IP).

The clients 160 may be general-purpose computers configured to execute applications over a variety of operating systems, including the UNIX® and Microsoft® Windows™ operating systems. Client systems generally utilize file-based access protocols when accessing information (in the form of files and directories) over an NAS-based network. Therefore, each client 160 may request the services of the storage appliance 500 by issuing file access protocol messages (in the form of packets) to the appliance over the network 165. For example, a client 160a running the Windows operating system may communicate with the storage appliance 100 using the Common Internet File System (CIFS) protocol over TCP/IP. On the other hand, a client 160b running the UNIX operating system may communicate with the multi-protocol appliance using either the Network File System (NFS) protocol over TCP/IP or the Direct Access File System (DAFS) protocol over a virtual interface (VI) transport in accordance with a remote DMA (RDMA) protocol over TCP/IP. It will be apparent to those skilled in the art that other clients running other types of operating systems may also communicate with the integrated multi-protocol storage appliance using other file access protocols.

The storage network "target" adapter 126 also couples the multi-protocol storage appliance 100 to clients 160 that may be further configured to access the stored information as blocks or disks. For this SAN-based network environment, the storage appliance is coupled to an illustrative Fibre Channel (FC) network 185. FC is a networking standard describing a suite of protocols and media that is primarily found in SAN deployments. The network target adapter 126 may comprise a FC host bus adapter (HBA) having the mechanical, electrical and signaling circuitry needed to connect the appliance 100 to a SAN network switch, such as a conventional FC switch 180. In addition to providing FC access, the FC HBA may offload fiber channel network processing operations for the storage appliance.

The clients 160 generally utilize block-based access protocols, such as the Small Computer Systems Interface (SCSI) protocol, when accessing information (in the form of blocks, disks or vdisks) over a SAN-based network. SCSI is a peripheral input/output (I/O) interface with a standard, device independent protocol that allows different peripheral devices, such as disks 130, to attach to the storage appliance 100. In SCSI terminology, clients 160 operating in a SAN environment are initiators that initiate requests and commands for data. The multi-protocol storage appliance is thus a target configured to respond to the requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

The multi-protocol storage appliance 100 supports various SCSI-based protocols used in SAN deployments, including SCSI encapsulated over TCP (iSCSI) and SCSI encapsulated over FC (FCP). The initiators (hereinafter clients 160) may thus request the services of the target (hereinafter storage appliance 100) by issuing iSCSI and FCP messages over the network 185 to access information stored on the disks. It will be apparent to those skilled in the art that the clients may also request the services of the integrated multi-protocol storage appliance using other block access protocols. By supporting a plurality of block access protocols, the multi-protocol storage appliance provides a unified and coherent access solution to vdisks/luns in a heterogeneous SAN environment.

The storage adapter 128 cooperates with the storage operating system 100 executing on the storage appliance to access information requested by the clients. The information may be stored on the disks 130 or other similar media adapted to store information. The storage adapter includes I/O interface circuitry that couples to the disks over an I/O interconnect arrangement, such as a conventional high-performance, FC serial link topology. The information is retrieved by the storage adapter and, if necessary, processed by the processor 122 (or the adapter 128 itself) prior to being forwarded over the system bus 123 to the network adapters 125, 126, where the information is formatted into packets or messages and returned to the clients.

Storage of information on the appliance 100 is preferably implemented as one or more storage volumes (e.g., VOL1-2 150) that comprise a cluster of physical storage disks 130, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

Specifically, each volume 150 is constructed from an array of physical disks 130 that are organized as RAID groups 140, 142, and 144. The physical disks of each RAID group include those disks configured to store striped data (D) and those configured to store parity (P) for the data, in accordance with an illustrative RAID 4 level configuration. However, other RAID level configurations (e.g. RAID 5) are also contemplated. In is the illustrative embodiment, a minimum of one parity disk and one data disk may be employed. However, a typical implementation may include three data and one parity disk per RAID group and at least one RAID group per volume.

One or more virtual disks (vdisks) may be stored within each volume. A vdisk is a special file type in a volume that derives from a plain (regular) file, but that has associated export controls and operation restrictions that support emulation of a disk. In the illustrative embodiment, a vdisk is a multi-inode object comprising a special file inode and a set of stream inodes that are managed as a single, encapsulated storage object within the file system of the storage system. As used herein, a set of stream inodes denotes one or more stream inodes. The vdisk illustratively manifests as an embodiment of a stream inode that, in cooperation with the special file inode, creates a new type of file storage object having the capacity to encapsulate specific security, management and addressing (export) information. A vdisk is, thus, an encapsulated data container comprising a data section and one or more metadata sections that may be stored in streams associated with the data section. An example of a stream inode object that may be advantageously used with the present invention is described in U.S. patent application Ser. No. 09/891,195 titled SYSTEM AND METHOD FOR REPRESENTING NAMED DATA STREAMS WITHIN AN ON-DISK STRUCTURE OF A FILE SYSTEM, by Kayuri Patel et al., which is hereby incorporated by reference as though fully set forth herein.

B. Storage Operating System

To facilitate access to the disks 130, the storage operating system 200 implements a write-anywhere file system that cooperates with virtualization modules to provide a function that "virtualizes" the storage space provided by disks 130. The file system logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as a hierarchical structure of named vdisks on the disks, thereby providing an integrated NAS and SAN appliance approach to storage by enabling file-based (NAS) access to the files and directories, while further enabling block-based (SAN) access to the vdisks on a file-based storage platform.

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system, including a write in-place file system, may be enhanced for use in accordance with the inventive principles described herein. As such, where the term "WAFL" is employed, it should be taken broadly to refer to any storage operating system that is otherwise adaptable to the teachings of this invention.

As used herein, the term "storage operating system" generally refers to the computer-executable code operable on a computer that manages data access and may, in the case of a multi-protocol storage appliance, implement data access semantics, such as the Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein. The term "metadata" refers to data that is generated, stored and managed by the storage operating system, and its associated file system layer, to maintain the structure and organization of the file system. Metadata can include, for example, security attributes associated with files or data containers. As the storage operating system and its associated file system generate metadata, it is referred to herein as "internally generated data." Conversely, all other data stored by the file system, including, for example, data generated by network clients and/or other processes in the storage operating system is referred to as "externally generated data."

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 2:
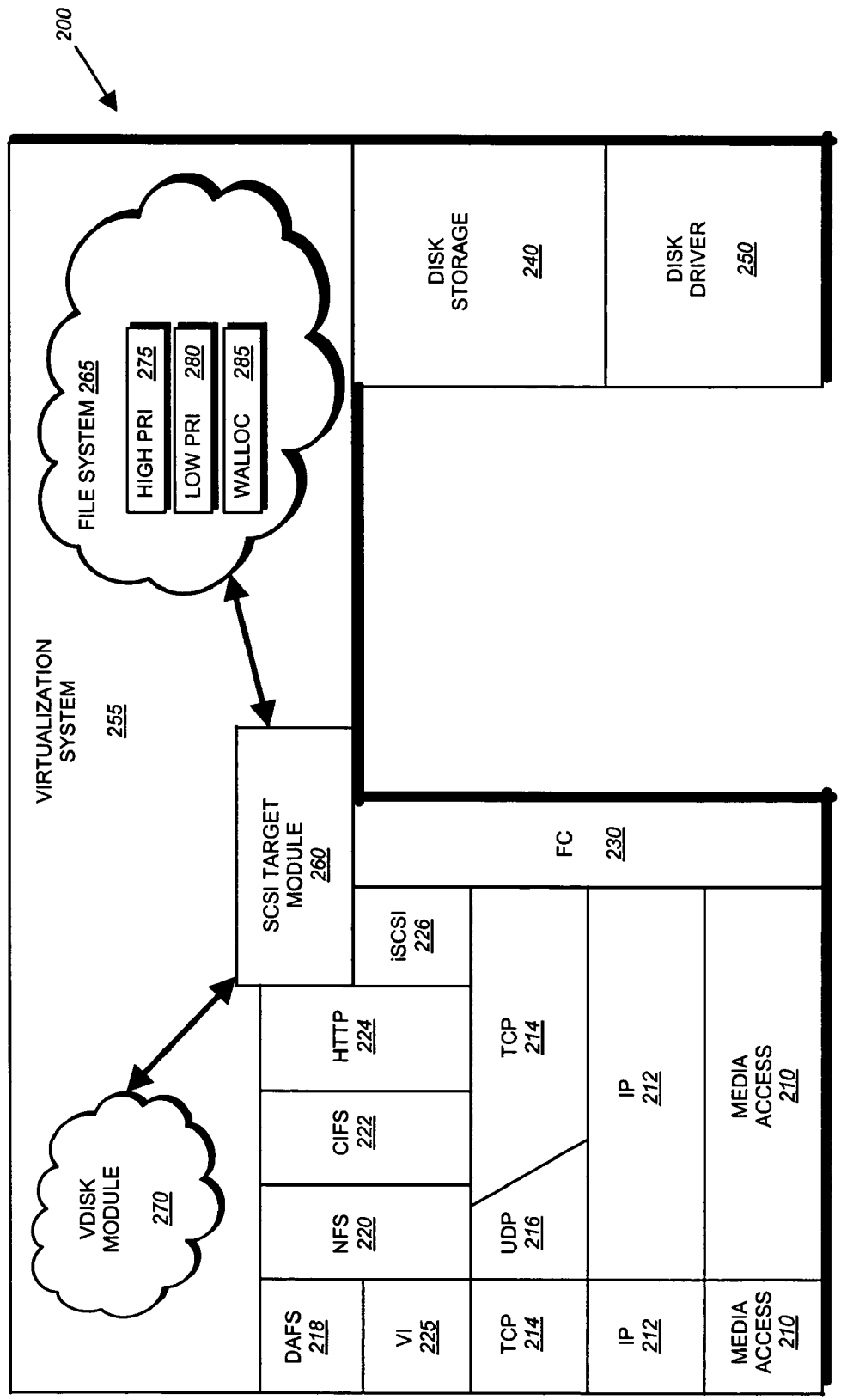
FIG. 2 is a schematic block diagram of an exemplary storage operating system in accordance with an embodiment of the present invention.

FIG. 2 is a schematic block diagram of the storage operating system 200 that may be advantageously used with the present invention. The storage operating system comprises a series of software layers organized to form an integrated network protocol stack or, more generally, a multi-protocol engine that provides data paths for clients to access information stored on the multi-protocol storage appliance using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the DAFS protocol 218, the NFS protocol 220, the CIFS protocol 222 and the Hypertext Transfer Protocol (HTTP) protocol 224. A VI layer 225 implements the VI architecture to provide direct access transport (DAT) capabilities, such as RDMA, as required by the DAFS protocol 218.

An iSCSI driver layer 226 provides block protocol access over the TCP/IP network protocol layers, while a FC driver layer 230 operates with the FC HBA 126 to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage appliance. In addition, the storage operating system includes a disk storage layer 240 that implements a disk storage protocol, such as a RAID protocol, and a disk driver layer 250 that implements a disk access protocol such as, e.g., a SCSI protocol.

Bridging the disk software layers with the integrated network protocol stack layers is a virtualization system 255 that is implemented by a file system 265 interacting with virtualization modules illustratively embodied as, e.g., vdisk module 270 and SCSI target module 260. It should be noted that the vdisk module 270, the file system 265 and SCSI target module 260 can be implemented in software, hardware, firmware, or a combination thereof. The vdisk module 270 interacts with the file system 265 to enable access by administrative interfaces in response to a system administrator issuing commands to the multi-protocol storage appliance 100. In essence, the vdisk module 270 manages SAN deployments by, among other things, implementing a comprehensive set of vdisk (lun) commands issued through a user interface by a system administrator. These vdisk commands are converted to primitive file system operations ("primitives") that interact with the file system 265 and the SCSI target module 260 to implement the vdisks.

The SCSI target module 260, in turn, initiates emulation of a disk or lun by providing a mapping procedure that translates luns into the special vdisk file types. The SCSI target module is illustratively disposed between the FC and iSCSI drivers 230, 226 and the file system 265 to thereby provide a translation layer of the virtualization system 255 between the SAN block (lun) space and the file system space, where luns are represented as vdisks. By "disposing" SAN virtualization over the file system 265, the multi-protocol storage appliance reverses the approaches taken by prior systems to thereby provide a single unified storage platform for essentially all storage access protocols.

The file system 265 is illustratively a message-based system; as such, the SCSI target module 260 transposes a SCSI request into a message representing an operation directed to the file system. For example, the message generated by the SCSI target module may include a type of operation (e.g., read, write) along with a pathname (e.g., a path descriptor) and a filename (e.g., a special filename) of the vdisk object represented in the file system. The SCSI target module 260 passes the message into the file system 265 as, e.g., a function call, where the operation is performed.

The file system 265 illustratively implements the WAFL file system having an on-disk format representation that is block-based using, e.g., 4 kilobyte (KB) blocks and using inodes to describe the files. The WAFL file system uses files to store metadata describing the layout of its file system; these metadata files include, among others, an inode file. A file handle, i.e., an identifier that includes an inode number, is used to retrieve an inode from disk. A description of the structure of the file system, including on-disk inodes and the inode file, is provided in the above-incorporated U.S. Pat. No. 5,819,292.

SAN clients typically identify and address disks by logical numbers or luns. However, the automated storage virtualization technique allows system administrators to manage vdisks and their addressing by logical names. To that end, the vdisk module 270 of the multi-protocol storage appliance maps logical names to vdisks. For example when creating a vdisk, the system administrator "right size" allocates the vdisk and assigns it a name that is generally meaningful to its intended application (e.g., /vol/vol0/database to hold a database).

The storage virtualization technique addresses the issue of performance limitations by defining a vdisk abstraction of a disk "on top of" the file system. This abstraction aggregates the bandwidth of the underlying disks by providing greater bandwidth for the vdisk than that obtainable by the concatenation of a smaller number of disk drives needed solely to satisfy space requirements. Additionally, delayed allocation policies and write coalescing of the file system can serve to optimize the bandwidth of the vdisk compared to a pure physical implementation. As noted, layering of the vdisk on top of the file system also allows the vdisk to inherit the reliability configuration (e.g., RAID 4 and/or synchronous mirroring) of the underlying volume.

Included within the file system 265 is a set of processes, including HighPri 275, LowPri 280 and WALLOC 285 that perform various file system operations. HighPri and LowPri perform identical functions with the only difference being the priority level at which they run. These two basic file system processes (HighPri 275 and LowPri 280) perform the work of the file system layer, e.g., loading blocks into the buffer cache, setting dirty bits to the blocks and acquiring blocks to be cleaned and/or write allocated. The HighPri and LowPri processes are further described in U.S. patent application Ser. No. 10/027,634, entitled FILE SYSTEM DEFRAGMENTATION TECHNIQUE VIA WRITE ALLOCATION, John K. Edwards, et al., the contents of which are hereby incorporated by reference as though fully set forth herein. The WALLOC process 235, in the illustrative embodiment, performs all write allocation operations. The WALLOC process is described further in the above-incorporated patent applications entitled SYSTEM AND METHOD FOR MANAGING FILE DATA IN A CONSISTENCY POINT and SYSTEM AND METHOD FOR MANAGING FILE METADATA IN A CONSISTENCY POINT.

C. Inodes and Buffer Trees

In the example of the illustrative WAFL file system a file is represented as an inode data structure adapted for storage on disks. Broadly stated, the on-disk format representation of the exemplary WAFL file system is block based using, e.g., 4-kilobyte (KB) blocks and using inodes to describe the files. An inode is a data structure used to store information, such as metadata, about the file. That is, the information contained in an inode may include, e.g., ownership of the file, access permission for the file, size of the file, or other attributes, described further below. The WAFL file system uses a file handle, i.e., an identifier that includes an inode number, to retrieve an inode from disk. The exemplary WAFL file system also uses files to store metadata describing the layout of its file system. These metadata files include, among others, an inode file. The on-disk format structure of the WAFL file system, including inodes and the inode file, is disclosed and described in the above-incorporated U.S. Pat. No. 5,819,292.

Figure 3:
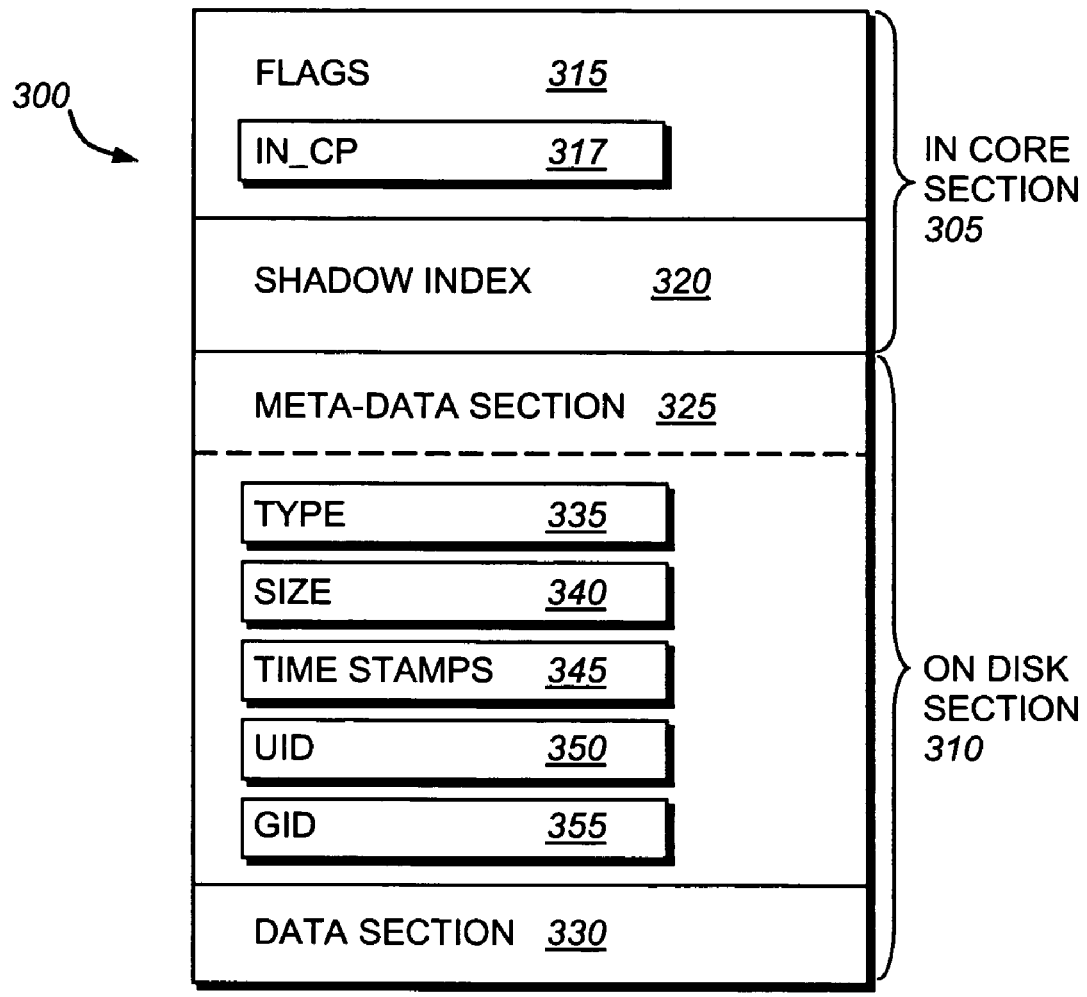
FIG. 3 is a schematic block diagram of an exemplary inode data structure in accordance with an embodiment of the present invention.

FIG. 3 is a schematic block diagram illustrating an exemplary inode 300, which preferably includes an in-core section 305 and on-disk section 310. In accordance with the illustrative embodiment, both the in-core section 305 and the on-disk section 310 are stored in memory; however, only the on-disk section 310 is written to disk during a consistency point. The in-core section 305 comprises a flags section 315 and a shadow index 320. The flag section 315, in turn, comprises a variety of flags including, for example, an IN_CP flag 317 that is set by the file system when the inode is actively modified during a CP write allocation phase. File system processes may, by examining the IN_CP flag, determine whether the inode is currently undergoing write allocation during a CP. The shadow index 320 is, in the illustrative embodiment, a two-byte value that serves as is an index to a shadow data entry which stores shadow or frozen state information when write operations are directed to an inode while it is being modified during a CP. Shadow data entries are described in the above-incorporated U.S. patent application entitled SYSTEM AND METHOD FOR MANAGING FILE METADATA DURING CONSISTENCY POINTS.

The on-disk section 310 illustratively includes a metadata section 325 and a data section 330. The information stored in the metadata section 325 of each inode 300 describes the file and, as such, includes the type (e.g., regular or directory) 335 of file, the size 340 of the file, time stamps (e.g., access and/or modification) 345 for the file and ownership, i.e., user identifier (UID 350) and group ID (GID 355), of the file. The contents of the data section 330 of each inode, however, may be interpreted differently depending upon the type of file (inode) defined within the type field 335. For example, the data section 330 of a directory inode contains metadata controlled by the file system, whereas the data section of a regular inode contains user-defined data. In this latter case, the data section 330 includes a representation of the data associated with the file.

Specifically, the data section 330 of a regular on-disk inode may include user data or pointers, the latter referencing 4 KB data blocks on disk used to store the user data. Each pointer is preferably a logical volume block number to thereby facilitate efficiency among the file system when accessing the data on disks. Given the restricted size (128 bytes) of the inode, user data having a size that is less than or equal to 64 bytes is represented, in its entirety, within the data section of that inode. However, if the user data is greater than 64 bytes but less than or equal to 64 kilobytes (KB), then the data section of the inode comprises up to 16 pointers, each of which references a 4 KB block of data on the disk. Moreover, if the size of the data is greater than 64 kilobytes but less than or equal to 64 megabytes (MB), then each pointer in the data section 150 of the inode references an indirect inode that contains 1024 pointers, each of which references a 4 KB data block on disk. In addition, the size field 340 of the metadata section 325 of the inode refers to the size of the file.

Figure 4:
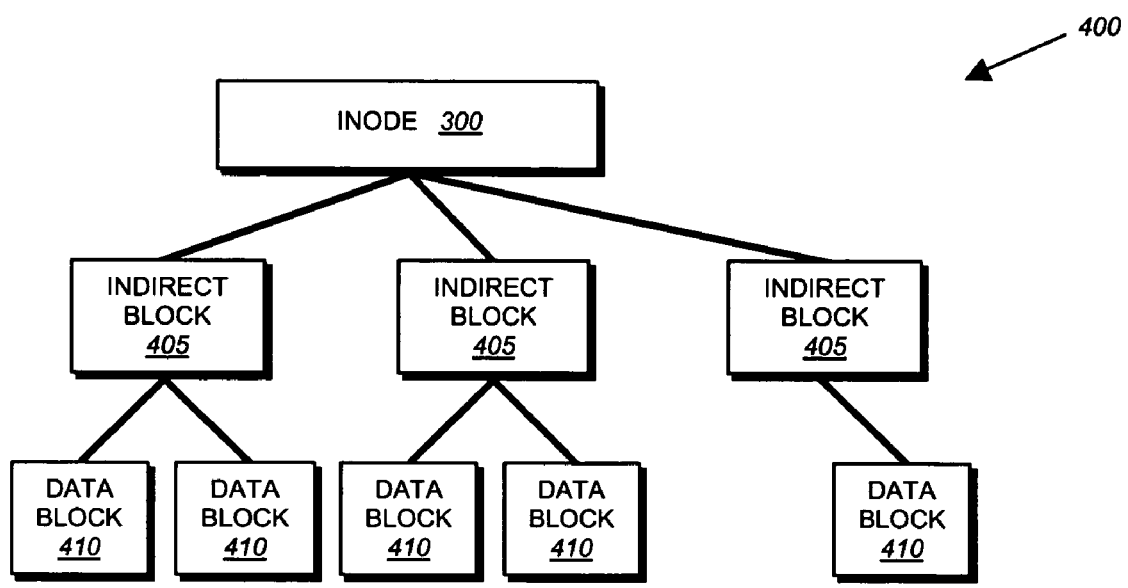
FIG. 4 is a schematic block diagram of an exemplary buffer tree inode data structure in accordance with an embodiment of the present invention.

An exemplary buffer tree 400 is shown in FIG. 4. Buffer trees are utilized by the file system to store data corresponding to a file. The root of the buffer tree 400 is an inode 300 that is utilized to store various metadata associated with the file. The inode 300, described above in reference to FIG. 3, contains one or more pointers to various level 2 blocks 410. Each level 2 block, in turn, contains one or more pointers to level 1 blocks 415 and each level 1 block 415 contains one or more pointers to level 0 data blocks 420. The level 1 and level 2 blocks 410 and 415 are intermediate inodes that store pointers to lower level blocks. In the illustrative embodiment, each intermediate block may contain pointers of up to 1024 lower level blocks. In the illustrative embodiment of the WAFL-based file system, each level 0 data block 420 stores four kilobytes (4 KB) of data.

D. Detecting Buffer Leaks

Figure 5:
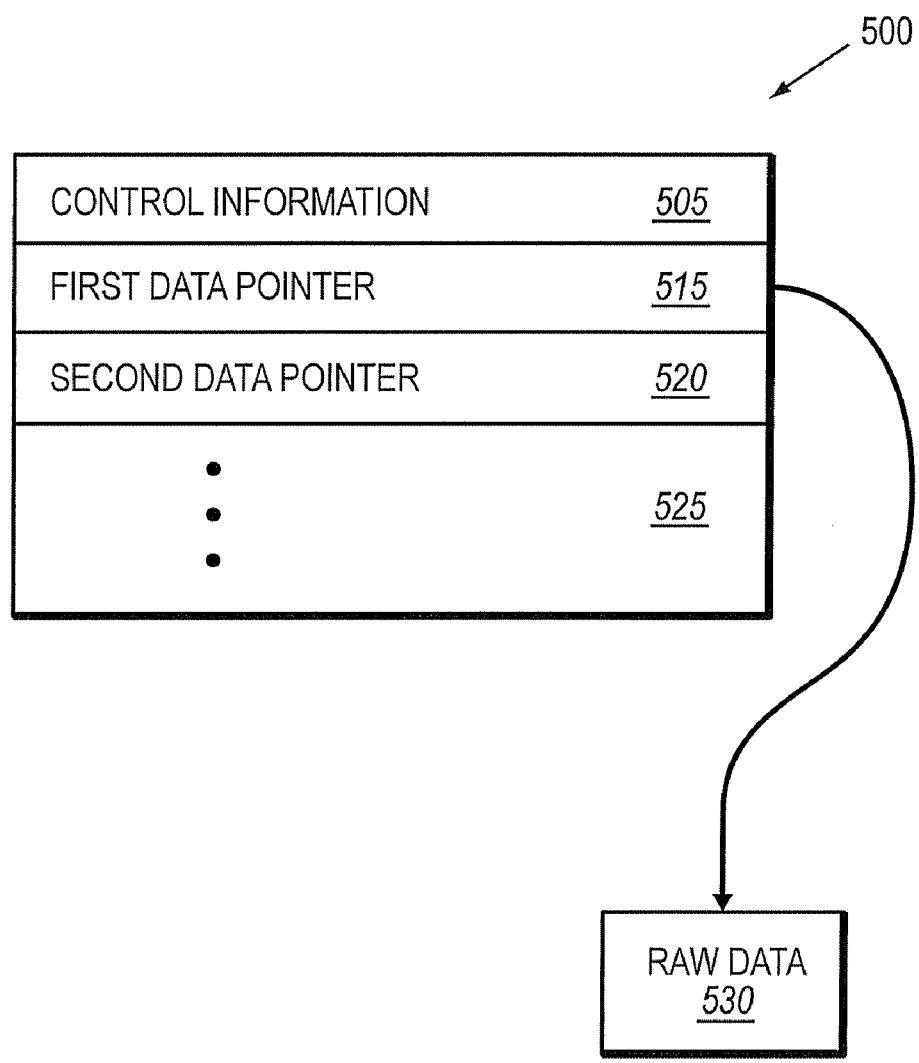
FIG. 5 is a schematic block diagram of an exemplary buffer data structure and pointer to raw data in accordance with an embodiment of the present invention.

In the memory 124 of the storage appliance 100, each data block is represented by a buffer control data structure containing pointers to the write data store in the one or more data buffers 530 as a result of incoming write operations. The buffer control data structure includes various metadata used for managing (tracking) the changes to the data buffer including, for example, whether the data buffer has been "dirtied" by write operations directed to it. An exemplary in-memory buffer control data structure 500 is shown in FIG. 5. The buffer control data structure includes control information 505, a first data pointer 515 and a second data pointer 520 along with, in alternative embodiments, additional fields 525. The control information 505 may include, for example, various flags such as whether the buffer is "dirty." A buffer is "dirtied" (and a "buffer dirty" flag is asserted) when new data is written to data buffer 530 so that the in-core representation of the file differs from the on-disk representation.

The first data pointer 515 and second data pointer 520 contain pointers (e.g., memory locations) to data buffers (such as data buffer 530) in memory 124 of the storage appliance 100 that hold the "raw" write data. For example, the data pointer 515 includes a memory location reference to raw data held in buffer 530. In operation of the storage appliance, the first and second data pointers 515, 520 may point to data associated with the current CP and the next CP. The present invention detects if one of the data pointers 515, 520 reference (points to) a raw data block that is associated with the incorrect CP, e.g., a pointer is associating data for the next CP with the current CP. Such incorrect buffer pointer referencing is referred to herein as "buffer leakage."

Figure 6:
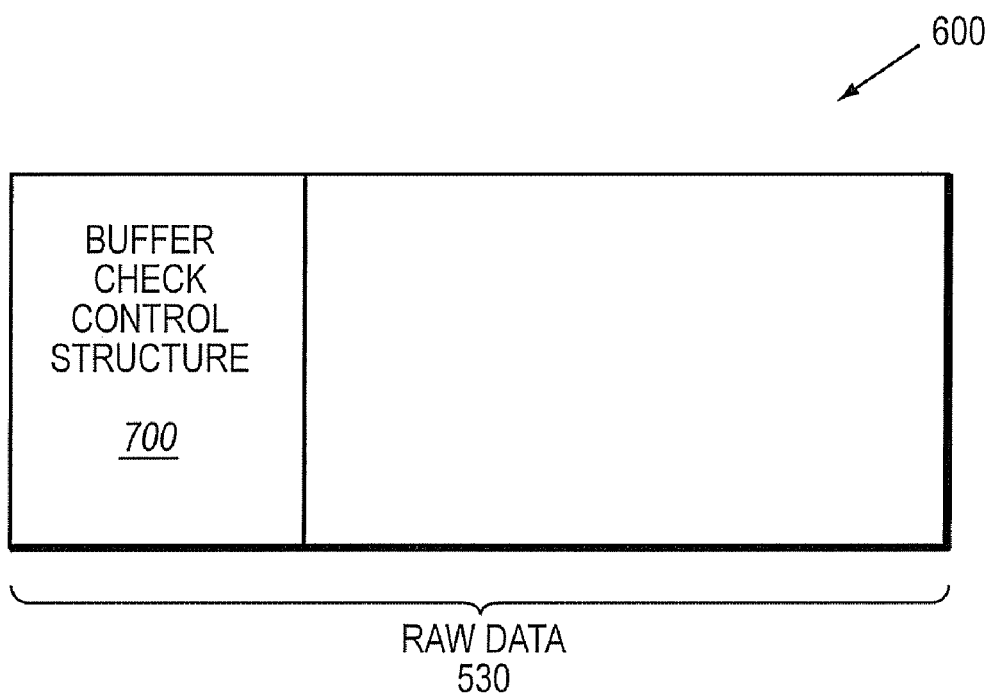
FIG. 6 is a schematic block diagram of an exemplary raw data buffer and buffer check control structure in accordance with an embodiment of the present invention.

FIG. 6 is a schematic block diagram illustrating modified data buffer 600 comprising an exemplary raw data buffer 530 configured to store "raw" (write) data associated with an incoming write operation. A first portion of the raw data buffer 530 is overwritten with a novel buffer check control structure 700, described further below. In accordance with the illustrative embodiment of the present invention, the buffer check control structure 700 overwrites the first portion of the raw data buffer 530 to enable detection of leaked buffer write operations across file system consistency points (CP). Overwriting the raw buffer is a destructive operation that destroys the overwritten data, e.g., the first portion of the data, rendering the data (and buffer) inaccessible. Adherence to such destructive overwriting for all write operations directed to the storage appliance, will result in corrupted user data and/or system files. To prevent such corruption, the present invention is directed to controlled and selective raw data areas, such as specified volumes and/or qtrees. These selected areas may be utilized for testing purposes. Thus, write operations directed to a test volume may be destructively labeled, whereas write operations to an active and in-use volume are not destructively labeled using the teachings of the present invention.

It should be noted that in alternate embodiments, the buffer check control structure may be prepended to the beginning or annexed to the end of the raw data buffer 530. In such embodiments, the buffer check control structure does not overwrite any of the data contained within the raw data buffer 530. During write allocation using a non-destructive label, the appropriate write allocation process (e.g., WALLOC 285) within the file system removes ("strips off") the buffer check control structure before the raw data is written to disk. In such embodiments, the labeling of write operations with the buffer check control structure is not destructive and therefore may be applied to all volumes and/or qtrees to provide improved reliability by ensuring the detection of buffer leakage from one CP to another CP.

Figure 7:
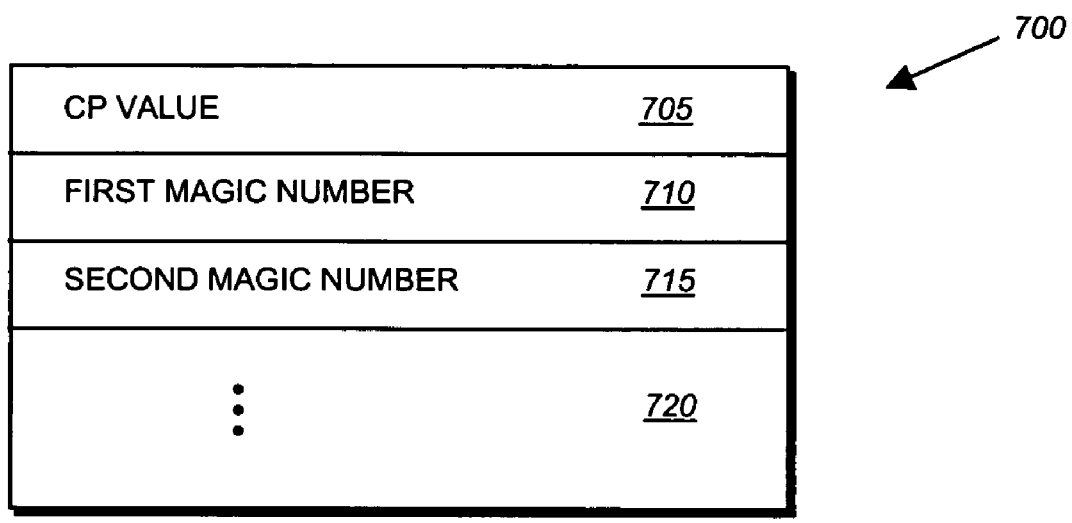
FIG. 7 is a schematic block diagram of an exemplary buffer check control structure in accordance with an embodiment of the present invention.

FIG. 7 is a schematic block diagram illustrating a partial format of the buffer check control structure 700 including fields for a CP value 705, a first magic number 710, and a second magic number 715. In alternate embodiments, additional fields 720 may be included. The CP value 705 contains, in the illustrative embodiment, a 32-bit value that identifies the current CP. It should be noted that in alternate embodiments a different sized value may be utilized to uniquely identify each CP. The 32-bit value is illustratively a monotonically increasing value i.e., it increments at the conclusion of each CP. When the buffer check control structure is created, the CP value is set to the value of the CP for which the buffer containing the buffer check control structure is to be written, i.e., the current CP or next CP value. Each first magic number field 710 and second magic number field 715 is, in the illustrative embodiment, a 32-bit value used to distinctively and uniquely identify the data structure as a buffer check control structure. In alternate embodiments, a single 64-bit magic number may be utilized. Similarly, as one skilled in the art will appreciate, any size magic number may be utilized to achieve the results of the present invention.

Figure 8:
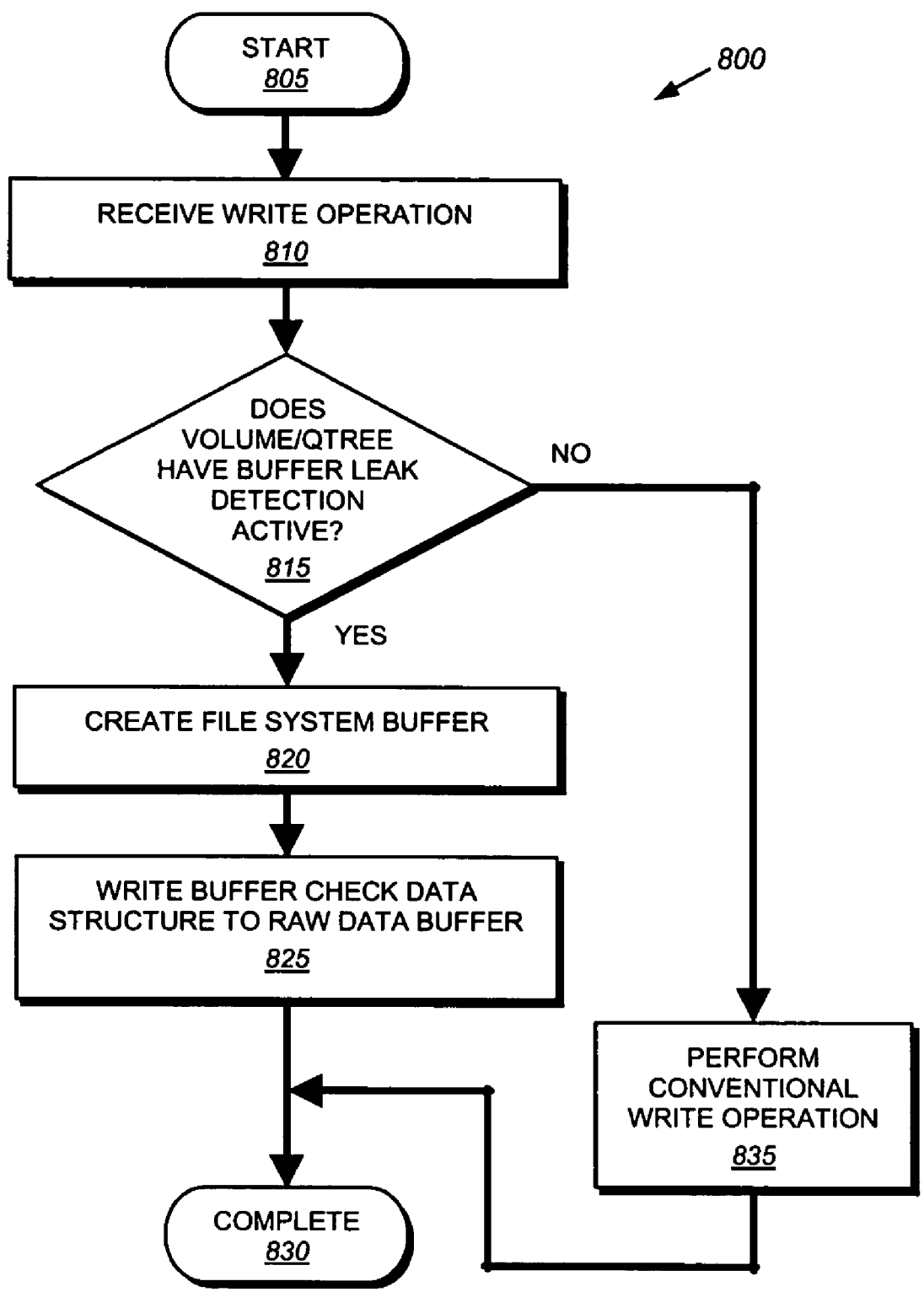
FIG. 8 is a flow chart detailing the steps of a procedure for processing write operations in accordance with an embodiment of the present invention.

FIG. 8 is a flowchart illustrating the steps of a procedure 800 performed by the storage operating system when processing write operations in accordance with an illustrative embodiment of the present invention. The procedure begins in step 805 and continues to step 810 where the storage appliance receives a write operation. This write operation may be received using conventional file or block access protocols over a network. In the illustrative embodiment, the write operation is directed to a file stored within the file system. However, in alternate embodiments, the write operation may be directed to a virtual disk (vdisk) or other data container embodied within the storage space of the storage appliance. As such, use of the term "file" herein should be taken to mean any acceptable data container. In step 815, the storage operating system determines whether the volume/qtree that contains the file has buffer leakage detection activated. Detection of buffer leakage may be activated on a volume or qtree level. In the illustrative embodiment, the buffer leakage detection capability of the storage operating system and file system may be selected by modifying a "buffer check" option (flag) in the inode associated with a volume or qtree. Specifically, when used as a destructive means of labeling data, the present invention may be limited to a predefined volume. However, if non-destructive labeling is utilized, the teachings may be implemented for all volumes and/or qtrees in a file system. If the volume or qtree to which the write operation is directed does not have buffer leakage detection activated (e.g., a non-asserted buffer check option) the procedure branches to step 835 where a conventional write operation is performed. The procedure then completes in step 830.

However, if the intended volume or qtree of the write operation has buffer leakage detection active, the procedure continues to step 820 where a file system "data" buffer is created. Next, in step 825, a buffer check control structure is created and written to the raw data buffer, thereby overwriting the initial portion of that buffer. This buffer check control structure includes the above-described magic numbers and CP value. The buffer check control structure may be prepended or annexed to the end of the raw data buffer, thereby implementing a non-destructive labeling of the raw data buffer. In such alternate embodiments, the buffer check control structure is created and prepended or annexed to the raw data buffer in step 825. The procedure then completes at step 830.

Figure 9:
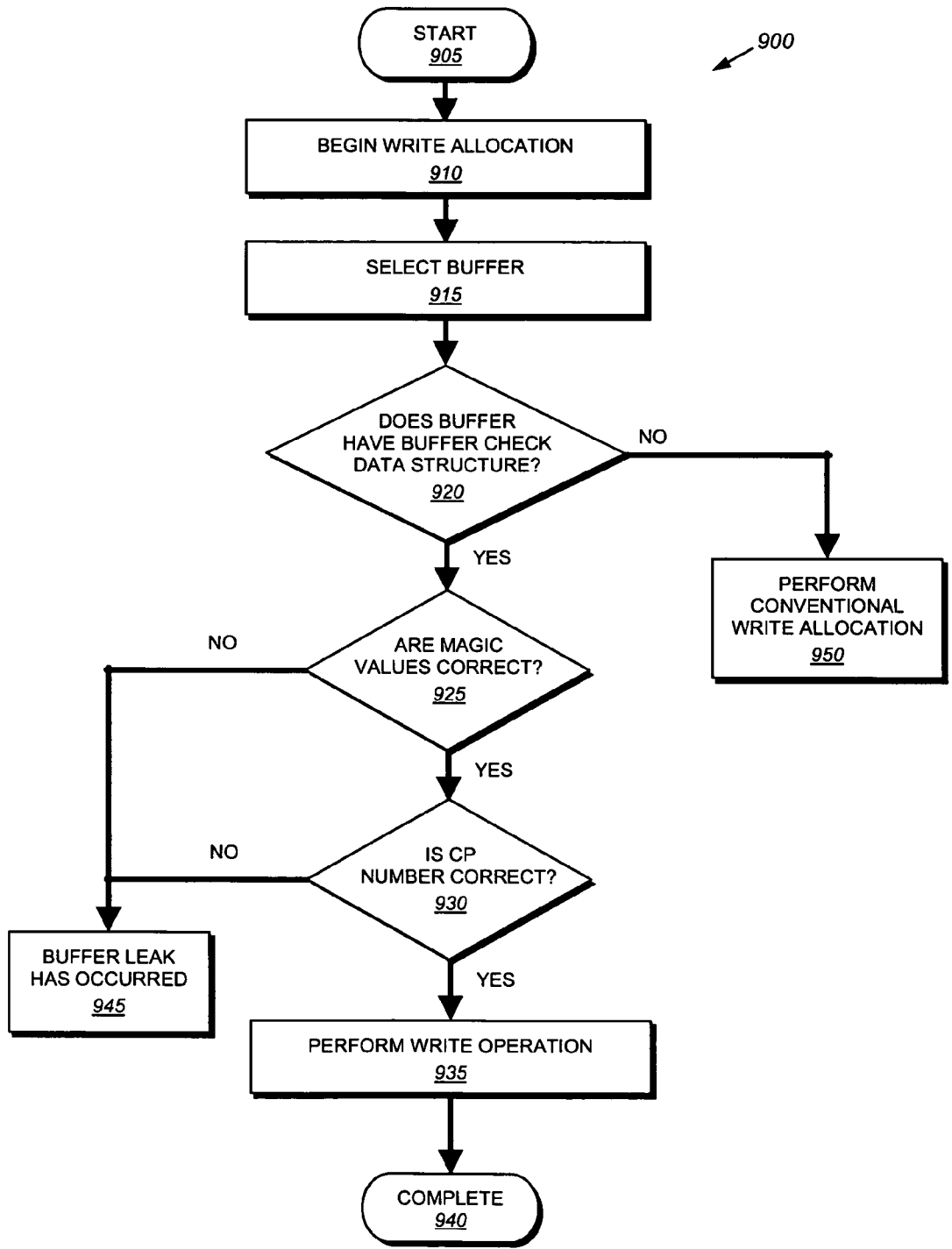
FIG. 9 is a flow chart detailing the steps of a procedure for performing write allocation in accordance with an embodiment of the present invention.

During the write allocation of the file, the appropriate determinations must be made as to whether any buffer leakage has occurred. FIG. 9 is a flowchart illustrating the steps of a procedure 900 for performing these determinations. The procedure begins in step 905 and continues to step 910 when the write allocation process begins. This write allocation process may be initiated by the file system initiating a CP in accordance with a conventional file system implementation. In step 915, a data buffer is selected for the write allocation process. This data buffer may be selected sequentially from among the buffers associated with an inode of the file or may be selected using any other appropriate technique to ensure that all dirty data buffers are write allocated. In step 920, a determination is made as to whether the buffer contains a buffer check control structure. This may be determined by analyzing, in the illustrative embodiment, the first portion of the raw data buffer to determine if it contains the appropriate magic values. In alternate embodiments, where the buffer check control structure is not overwritten onto the first portion of the raw data buffer, the procedure checks the appropriate location within the raw data buffer for the magic values. For example, if the buffer check control structure is annexed to the end of the raw data buffer, the procedure will examine the last portion of the raw data buffer to determine if it contains the appropriate magic values. If the selected buffer does not have a buffer check control structure, the volume/qtree containing the destination file is not utilizing buffer leakage detection. In such a case, the procedure branches to step 950 and performs a conventional write allocation procedure. This conventional write allocation procedure processes the various dirty buffers and writes them to disk using well-known file system write allocation techniques.

If, however, the buffer contains a buffer check control structure, the procedure continues to step 925 where a determination is made if the magic values are correct. In step 930, another determination is made as to whether the CP value stored in the buffer check control structure is correct. In accordance with the illustrative embodiment, the CP contained within a buffer check control structure should be the CP value for the current CP. If the CP value is not correct, e.g., the CP value stored in the buffer check control structure is for the next CP, then the procedure branches to step 945 and identifies that a buffer leak has occurred. In response to such buffer leakage, the storage operating system and/or file system may take appropriate pre-defined actions, including, for example, alerting the administrator of the leakage. As a result, the leaked buffer is not written to disk. This guarantees that the file system is not corrupted due to buffer leakage.

However, if the CP number is correct (step 930), the procedure then continues to step 935 where the write operation is performed by committing the contents of the data buffer to disk. If, as in alternate embodiments, a non-destructive buffer check control structure is utilized (e.g., the buffer check control structure is appended to the end of the raw data), then only the raw data is committed to disk and the buffer check control structure is not written to disk. Once the write operation has finished, the procedure completes (step 940).

By utilizing the write allocation procedure 900, the file system ensures that only data buffers that have correct buffer check control structures and are associated with the proper CP are committed to disk. This technique prevents buffers from leaking across a CP and corrupting a file system.

To again summarize, the present invention is directed to a system and method for detecting buffer leaks across multiple consistency points in a file system. In accordance with the illustrative embodiment, upon receipt of a write operation directed to a file stored within a volume or qtree that has buffer leakage detection active, a buffer check control structure is overwritten onto the first portion of the raw data buffer. During write allocation of the file, a determination that the buffer contains a buffer check control structure is made by examining the appropriate magic values. Before committing the buffer to disk, a further check is made to ensure that the CP value contained within the buffer check control structure is the appropriate CP value for the current CP. If the CP value stored within the buffer check control structure is not the CP value of the current CP, then a buffer leak has occurred and a write operation is not permitted.

In alternate embodiments, a non-destructive buffer check control structure is utilized that is prepended to the raw data buffer or annexed to the end of the buffer check data or raw data buffer. In such embodiments, during the write allocation phase, if the buffer is to be committed to disk, the buffer check control structure is stripped from the buffer so that only the received raw data within the raw data buffer is committed to disk.

The foregoing has been a detailed description of the illustrative embodiment of the present invention. There is modifications and additions can be made without departing from the spirit and scope of the invention. Additionally, while this description has been written with reference to storage appliances and file servers, the principles are equally pertinent to all types of computers. Furthermore, it is expressly contemplated that the teachings of this invention can be implemented as software, including a computer-readable media having program instructions executing on a computer, hardware, firmware, or a combination thereof. Accordingly this description is to be taken only by way of example and not to otherwise limit the scope of the invention.

What is claimed is:

1. A method for operating a storage system, comprising:
   initiating writing a first consistency point (CP) at a first time, a CP being a wholly consistent and up-to-date version of an old data of the file system which is written to persistent storage, the old data received by the storage system since an earlier CP was written to persistent storage, and the old data stored in an old buffers in memory of the storage system;

determining a first consistency point number assigned to the first CP, the first CP number to identify the old buffers as holding data to be written to persistent storage during the first CP;

receiving a write operation to add new data to the storage system, the write operation identifying a file for the write operation to store the new data, the new data written to a new buffer in memory of the storage system;

continuing to receive write operations for the new data during writing the first CP, the new data to be written to a second CP at a later second time, the new data written to a new data buffers in memory of the storage system;

determining that a volume storing the file has buffer leakage detection activated;

while writing the new data to the new data buffers, and in response to determining that the volume has buffer leakage detection activated, writing a buffer check control structure to the new data buffer, the buffer check control structure including one or more uniquely identifying numbers referred to as magic numbers, and an identifying consistency point number, the magic numbers to uniquely identify the new data buffer as a labeled buffer check control structure and to indicate that the data buffer needs to be checked for leakage; and comparing a buffer consistency point number read from an old buffer with the first consistency point number, the magic numbers to identify the buffer check control structure containing the buffer consistency point number, and if the buffer consistency point number agrees with the first consistency point number, continuing to write the first consistency point, and continuing to write the new data to the new data buffers, and in the event that the buffer consistency point number disagrees with the first consistency point number, signaling an administrator that buffer leakage between consistency points has occurred, and halting writing of the first consistency point, and halting write operations to add new data to the storage system.

2. The method of claim 1 wherein the step of creating the data buffer further comprises:

creating the buffer check control structure and the raw data buffer.

3. The method of claim 2 wherein the buffer check control structure comprises a pointer to the raw data buffer.

4. The method of claim 1 wherein the step of writing the buffer check control structure to the raw data buffer further comprises:

creating the buffer check control structure; and
overwriting a portion of the raw data buffer with the buffer check control structure.

5. The method of claim 1 wherein the step of writing the buffer check control structure to the raw data buffer further comprises:

creating the buffer check control structure; and
associating the buffer check control structure to the raw data buffer in a contiguous block of memory.

6. The method of claim 1 wherein the magic numbers uniquely identify a particular buffer check control structure.

7. The method of claim 1 wherein the one or more magic numbers comprises a 64-bit number.

8. The method of claim 1 wherein the one or more magic numbers comprises two 32-bit numbers.

9. The method of claim 1 wherein the consistency point number identifies a current consistency point.

10. The method of claim 1 wherein the consistency point number comprises a 32-bit number.

11. A method for detecting leaked buffer writes between a first consistency point and a second consistency point, comprising:

initiating writing a first consistency point (CP) at a first time, a CP being a wholly consistent and up-to-date version of an old data of the file system which is written to persistent storage, the old data received by the storage system since an earlier CP was written to persistent storage, and the old data stored in an old buffer in memory of the storage system;

determining a first consistency point number assigned to the first CP, the first CP number to identify the old buffers as holding data to be written to persistent storage during the first CP;

selecting an old data buffer;

determining if one or more uniquely identifying numbers (hereinafter magic numbers) are within the old data buffer, the magic numbers to uniquely identify the old data buffer as having a labeled buffer check control structure and to indicate that the old data buffer needs to be checked for leakage;

reading an identifying consistency point number from the labeled buffer check control structure;

receiving a write operation to add new data to the storage system, the new data to be written to a second CP at a later second time, the new data written to a new data buffer in memory of the storage system;

comparing a buffer consistency point number read from the old buffer with the first consistency point number, and if the buffer consistency point number agrees with the first consistency point number, continuing to write the first consistency point, and continuing to write the new data to the new data buffer, and in the event that the buffer consistency point number disagrees with the first consistency point number, signaling an administrator that buffer leakage between consistency points has occurred, and halting writing of the first consistency point, and halting write operations to add new data to the storage system.

12. The method of claim 11 wherein the one or more magic numbers comprise a 64-bit magic number.

13. The method of claim 11 wherein the one or more magic numbers further comprises two 32-bit magic numbers.

14. The method of claim 11 wherein the step of determining if the consistency point number is correct further comprises:

determining if the consistency point number within the buffer check control structure equals a consistency point number identifying a current consistency point.

15. The method of claim 11 wherein the step of performing a write operation further comprises:

writing a set of raw data within the data buffer to a disk.

16. The method of claim 15 wherein the raw data comprises the buffer check control structure.

17. The method of claim 15 wherein the step of performing the write operation further comprises:

removing the buffer check control structure from the raw data before writing the file system buffer to disk.

18. The method of claim 15 wherein the step of performing the write operation comprises:

writing only the raw data within the file system buffer to disk.

19. The method of claim 11, further comprising:

detecting buffer leakage in response to determining that the one or more magic numbers within the buffer check control structure are correct and that the consistency point number is not correct.

20. A computer storage system apparatus, comprising:
- a storage operating system executing on the storage system to write a first consistency point (CP) at a first time, a CP being a wholly consistent and up-to-date version of an old data of the file system which is written to persistent storage, the old data received by the storage system since an earlier CP was written to persistent storage, and the old data stored in an old data buffer in memory of the storage system;
- the storage operating system to determine a first consistency point number assigned to the first CP, the first CP number to identify the old buffers as holding data to be written to persistent storage during the first CP;
- a write operation received by the storage system, the write operation identifying a file for the write operation to be performed on;
- the storage operating system to determine that a volume storing the file has buffer leakage detection activated;
- a new data buffer created to store new data from the write operation; and
- the storage operating system to compare a buffer consistency point number read from an old buffer with the first consistency point number, and if the buffer consistency point number agrees with the first consistency point number, continuing to write the first consistency point, and continuing to write the new data to the new data buffer, and
- in the event that the buffer consistency point number disagrees with the first consistency point number, signaling an administrator that buffer leakage between consistency points has occurred, and halting writing of the first consistency point, and halting write operations to add new data to the storage system.

21. The apparatus of claim 20 wherein the data buffer created to associate with the write operations comprises the buffer check control structure and the raw data buffer.

22. The apparatus of claim 21 wherein the buffer check control structure comprises a pointer to the raw data buffer.

23. The apparatus of claim 20 wherein the buffer check control structure to write to a raw data buffer associated with the data buffer further comprises the buffer check control structure to overwrite a portion of the raw data buffer.

24. The apparatus of claim 20 wherein the buffer check control structure to write to the raw data buffer further comprises the buffer check control structure to associate with the raw data buffer in a contiguous block of memory.

25. The apparatus of claim 20 wherein the one or more magic numbers comprises a 64-bit number.

26. The apparatus of claim 20 wherein the one or more magic numbers comprises two 32-bit numbers.

27. The apparatus of claim 20 wherein the consistency point number is configured to identify a current consistency point.

28. The system of claim 20 wherein the consistency point number comprises a 32-bit number.

29. A method for operating a computer storage system, comprising:
- initiating writing a first consistency point (CP) at a first time, a CP being a wholly consistent and up-to-date version of an old data of the file system which is written to persistent storage, the old data received by the storage system since an earlier CP was written to persistent storage, and the old data stored in an old buffer in memory of the storage system;
- determining a first consistency point number assigned to the first CP, the first CP number to identify the old buffers as holding data to be written to persistent storage during the first CP;
- receiving a write operation, wherein the write operation identifies a data container for the write operation to store a new data in, the new data to be written to a second CP at a later second time, the new data written to a new data buffer in memory of the storage system;
- determining that a volume storing the data container has buffer leakage detection activated;
- reading an identifying consistency point number from a labeled buffer check control structure read from the old buffer;
- comparing a buffer consistency point number read from the old buffer with the first consistency point number, and if the buffer consistency point number agrees with the first consistency point number, continuing to write the first consistency point, and continuing to write the new data to the new data buffer, and
- in the event that the buffer consistency point number disagrees with the first consistency point number, signaling an administrator that buffer leakage between consistency points has occurred, and halting writing of the first consistency point, and halting write operations to add new data to the storage system.

30. The method of claim 29, wherein the data container is a virtual disk or a file.

31. The method of claim 29, wherein the first consistency point is the current consistency point.

32. The method of claim 29, wherein the step of creating the data buffer further comprises:
- creating the buffer check control structure and the raw data buffer.

33. The method of claim 29, wherein the step of writing the buffer check control structure to the raw data buffer further comprises:
- creating the buffer check control structure; and
- overwriting a portion of the raw data buffer with the buffer check control structure.

34. The method of claim 29, wherein the step of writing the buffer check control structure to the raw data buffer further comprises:
- creating the buffer check control structure; and
- associating the buffer check control structure to the raw data buffer in a contiguous block of memory.

35. A method for detecting leaked buffer writes between a first consistency point and a second consistency point, the method comprising:
- initiating writing a first consistency point (CP) at a first time, a CP being a wholly consistent and up-to-date version of an old data of the file system which is written to persistent storage, the old data received by the storage system since an earlier CP was written to persistent storage, and the old data stored in an old buffer in memory of the storage system;
- determining a first consistency point number assigned to the first CP, the first CP number to identify the old buffers as holding data to be written to persistent storage during the first CP;
- selecting an old data buffer;
- reading an identifying consistency point number from the old buffer;
- receiving a write operation, the write operation identifying a file for the write operation to write new data into, the new data to be written to a second CP at a later second time, the new data written to a new data buffer in memory of the storage system;

comparing the identifying consistency point number from the old buffer with the first consistency point number, and if the identifying consistency point number agrees with the first consistency point number, continuing to write the first consistency point, and continuing to write the new data to the new data buffer, and in the event that the buffer consistency point number disagrees with the first consistency point number, signaling an administrator that buffer leakage between consistency points has occurred, and halting writing of the first consistency point, and halting write operations to add new data to the storage system.

36. The method of claim 35 further comprising:
creating the buffer check control structure and the raw data buffer.

37. The method of claim 36 further comprising:
writing a pointer to the raw data buffer into the buffer check control structure.

38. The method of claim 35 further comprising:
creating the buffer check control structure; and
overwriting a portion of the raw data buffer with the buffer check control structure.

39. The method of claim 35 further comprising:
creating the buffer check control structure; and
associating the buffer check control structure to the raw data buffer in a contiguous block of memory.

40. The method of claim 35 further comprising:
uniquely identifying a particular buffer check control structure by the magic numbers.

41. The method of claim 35 further comprising:
using a 64-bit number as the one or more magic numbers.

42. The method of claim 35 further comprising:
using two 32-bit numbers as the one or more magic numbers.

43. The method of claim 35 further comprising:
identifying a current consistency point by the consistency point number.

44. The method of claim 35 further comprising:
using a 32-bit number as the consistency point number.

45. A method for operating a computer storage system, comprising:

initiating writing a first consistency point (CP) at a first time, a CP being a wholly consistent and up-to-date version of an old data of the file system which is written to persistent storage, the old data received by the storage system since an earlier CP was written to persistent storage, and the old data stored in an old buffer in memory of the storage system;

determining a first consistency point number assigned to the first CP, the first CP number to identify the old buffers as holding data to be written to persistent storage during the first CP;

reading an identifying consistency point number from the old data buffer;

receiving a write operation to add new data to the storage system, the new data to be written to a second CP at a later second time, the new data written to a new data buffers in memory of the storage system; and comparing a buffer consistency point number read from an old buffer with the first consistency point number, and if the buffer consistency point number agrees with the first consistency point number, continuing to write the first consistency point, and continuing to write the new data to the new data buffer, and in the event that the buffer consistency point number disagrees with the first consistency point number, signaling an administrator that buffer leakage between consistency points has occurred, and halting writing of the first consistency point, and halting write operations to add new data to the storage system.

46. The method as in claim 45, further comprising:
reading a buffer check control structure from the old data buffer, the buffer check control structure including one or more uniquely identifying numbers referred to as magic numbers and the identifying consistency point number, the magic numbers to uniquely identify the new data buffer as a buffer check control structure.

47. The method as in claim 45, further comprising:
writing a buffer check control structure into the new data buffer, the buffer check control structure including one or more uniquely identifying numbers referred to as magic numbers and a new consistency point number, the magic numbers to uniquely identify the new data buffer as a buffer check control structure and the new consistency point number to identify the buffer as to be written to persistent storage during writing the second consistency point at the second time.

48. The method as in claim 45, further comprising:
in response to reading a reading one or more uniquely identifying numbers referred to as magic numbers from the old data buffer, identifying a buffer check control structure, the buffer check control structure including the identifying consistency point number from the old data buffer.

49. The method as in claim 48, further comprising:
in response to reading the one or more uniquely identifying numbers referred to as magic numbers from the old data buffer, determining that a volume storing the data has buffer leakage detection activated.

50. The method as in claim 45, further comprising:
continuing to receive write operations for the new data during writing the first CP.

51. A computer storage system, comprising:

a storage operating system executing on the storage system to write a first consistency point (CP) at a first time, a CP being a wholly consistent and up-to-date version of an old data of the file system which is written to persistent storage, the old data received by the storage system since an earlier CP was written to persistent storage, and the old data stored in an old buffer in memory of the storage system;

the storage operating system to determine a first consistency point number assigned to the first CP, the first CP number to identify the old buffers as holding data to be written to persistent storage during the first CP;

the storage operating system to read an identifying consistency point number from the old data buffer;

the storage system to receive a write operation to add new data to the storage system, the new data to be written to a second CP at a later second time, the new data written to a new data buffer in memory of the storage system; and the storage operating system to compare a buffer consistency point number read from an old buffer with the first consistency point number, and if the buffer consistency point number agrees with the first consistency point number, continuing to write the first consistency point, and continuing to write the new data to the new data buffer, and in the event that the buffer consistency point number disagrees with the first consistency point number, signaling an administrator that buffer leakage between consistency points has occurred, and halting writing of the first consistency point, and halting write operations to add new data to the storage system.

52. The computer storage system as in claim 51, further comprising:
a buffer check control structure read from the old data buffer, the buffer check control structure including one or more uniquely identifying numbers referred to as magic numbers and the identifying consistency point number, the magic numbers to uniquely identify the new data buffer as a buffer check control structure.

53. The computer storage system as in claim 51, further comprising:
a buffer check control structure to be written into the new data buffer, the buffer check control structure including one or more uniquely identifying numbers referred to as magic numbers and a new consistency point number, the magic numbers to uniquely identify the new data buffer as a buffer check control structure and the new consistency point number to identify the buffer as to be written to persistent storage during writing the second consistency point at the second time.

54. The computer storage system as in claim 51, further comprising:
in response to reading a reading one or more uniquely identifying numbers referred to as magic numbers from the old data buffer, identifying a buffer check control structure, the buffer check control structure including the identifying consistency point number from the old data buffer.

55. The computer storage system as in claim 54, further comprising:
in response to reading the one or more uniquely identifying numbers referred to as magic numbers from the old data buffer, the computer storage system to determine that a volume storing the data has buffer leakage detection activated.

56. The computer storage system as in claim 51, further comprising:
the computer storage system to continue to receive write operations for the new data during writing the first CP.

57. A computer readable storage media, comprising:
said computer readable storage media containing instructions for execution on a processor for a method of operating a computer storage system, having,
initiating writing a first consistency point (CP) at a first time, a CP being a wholly consistent and up-to-date version of an old data of the file system which is written to persistent storage, the old data received by the storage system since an earlier CP was written to persistent storage, and the old data stored in an old buffer in memory of the storage system;
determining a first consistency point number assigned to the first CP, the first CP number to identify the old buffers as holding data to be written to persistent storage during the first CP;
reading an identifying consistency point number from the old data buffer;
receiving a write operation to add new data to the storage system, the new data to be written to a second CP at a later second time, the new data written to a new data buffers in memory of the storage system; and
comparing a buffer consistency point number read from an old buffer with the first consistency point number, and if the buffer consistency point number agrees with the first consistency point number, continuing to write the first consistency point, and continuing to write the new data to the new data buffer, and
in the event that the buffer consistency point number disagrees with the first consistency point number, signaling an administrator that buffer leakage between consistency points has occurred, and halting writing of the first consistency point, and halting write operations to add new data to the storage system.

* * * * *